United States Patent [19]

Futami

[11] Patent Number: 4,821,262

[45] Date of Patent: Apr. 11, 1989

[54] SYSTEM FOR TRANSMITTING AND RECEIVING DATA IN A TIME-DIVISION MULTIPLEX MODE APPLICABLE TO A VEHICLE

[75] Inventor: Toru Futami, Kanagawa, Japan

[73] Assignee: Nissan Motor Company, Limited, Yokohama, Japan

[21] Appl. No.: 97,839

[22] Filed: Sep. 17, 1987

[30] Foreign Application Priority Data

Sep. 18, 1986 [JP] Japan .................. 61-218125

[51] Int. Cl.[4] ............................................. H04J 3/02
[52] U.S. Cl. ......................................... 370/85; 370/9; 307/10.1
[58] Field of Search ............. 370/85, 9, 101, 100; 375/113; 307/9, 10 R

[56] References Cited

U.S. PATENT DOCUMENTS

| | | | |
|---|---|---|---|
| 4,176,250 | 11/1979 | Berglind | 370/9 |
| 4,241,444 | 12/1980 | Kister | 370/9 |
| 4,370,561 | 1/1983 | Briggs | 307/9 |
| 4,674,084 | 6/1987 | Suzuki et al. | 370/85 |
| 4,694,294 | 9/1987 | Suzuki et al. | 340/825.14 |
| 4,706,245 | 11/1987 | Suzuki et al. | 370/100 |
| 4,712,211 | 12/1987 | Suzuki et al. | 370/100 |

Primary Examiner—Douglas W. Olms
Attorney, Agent, or Firm—Foley & Lardner, Schwartz, Jeffery, Schwaab, Mack, Blumenthal & Evans

[57] ABSTRACT

A time-division multiplexing data transmission/reception system applicable to a vehicle is disclosed in which a multiplexing synchronizer, for generating and outputting a pulse train signal to a single data transmission line, is connected between a power supply and a data transmission line. The pulse train signal has a master synchronization interval defined by disconnecting the power supply from the signal transmission line for a first predetermined time width and has a plurality of communication channel intervals, each communication channel interval being defined by connecting the power supply to the signal transmission line for a second predetermined time width followed by disconnecting the power supply from the signal transmission line for a third predetermined width. A transmitter transmits data, having one of two different pulse widths during a specified communication channel interval, to the signal transmission line. Then, a receiver receives data whose pulse width is changed according to the input state of an external apparatus which is connected to the transmitter and outputs the data to an external load thereof so that the load is actuated or deactuated.

12 Claims, 5 Drawing Sheets

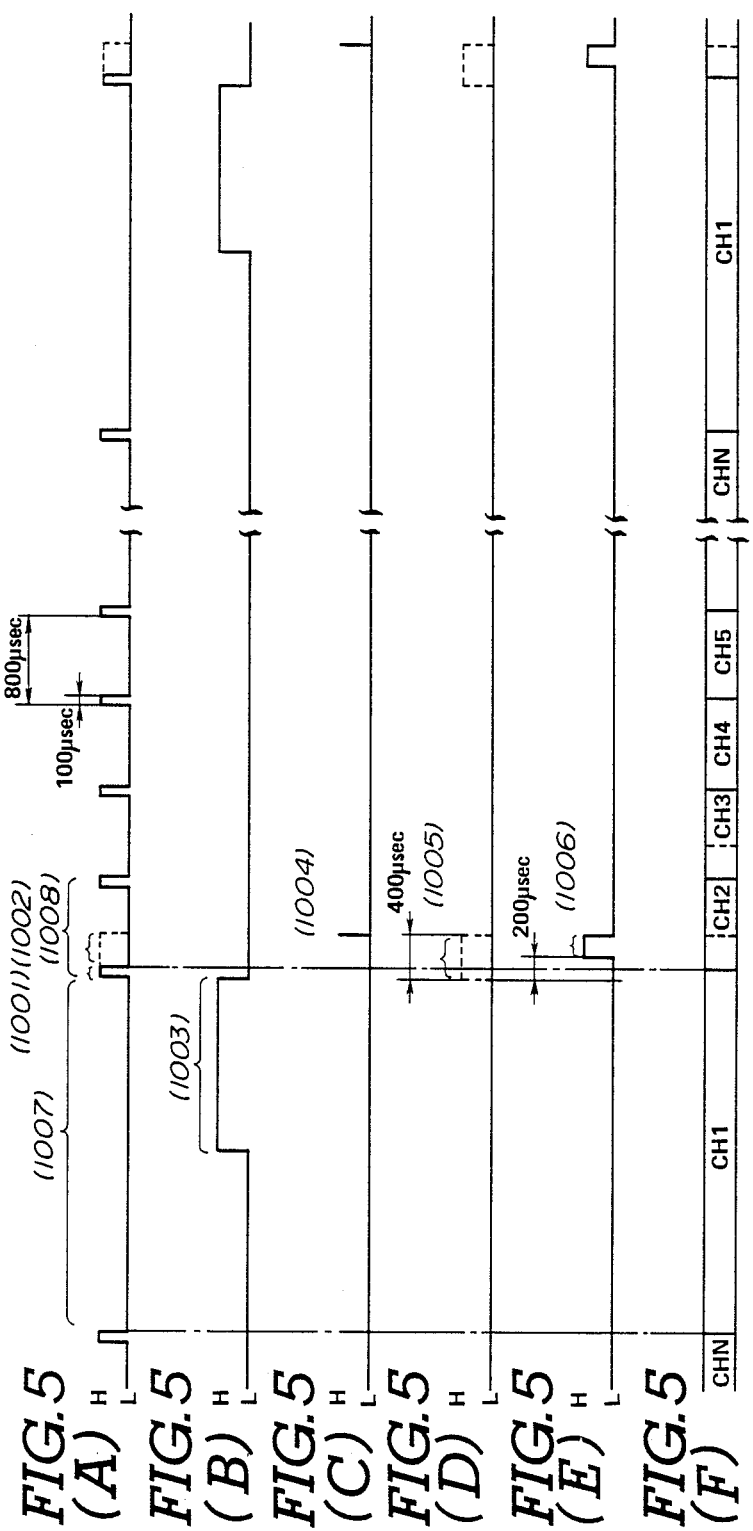

4,821,262

SYSTEM FOR TRANSMITTING AND RECEIVING DATA IN A TIME-DIVISION MULTIPLEX MODE APPLICABLE TO A VEHICLE

BACKGROUND OF THE INVENTION

The present invention relates to a time-division multiplexing data transmitting and receiving system which is applicable to a vehicle and which has a high data transmission reliability.

A U.S. Pat. No. 4,370,561 issued on Jan. 25, 1983 exemplifies a conventional time-division multiplexing system.

In the above-identified U.S. Patent document, a vehicle power supply (car battery) is connected to each transmit and receive unit, a synchronizer (multiplex timing unit), and loads via a circuit protector and a power supply line.

The synchronizer outputs a synchronization signal via a communication line to each receive and transmit unit in the vehicle. The synchronization signal is a pulse train having a pulse period defining a master synchronization interval. The transmit units and the receive units count negative-going pulses subsequent to the pulse defining the master synchronization interval to detect a transmission/reception channel. Subsequent to the negative-going pulse, the synchronization signal provides another pulse, the period thereof defining a data transmission interval. During the data transmission interval, the output state of the synchronizer is in a floating state (high impedance). One of the transmit units outputs data in the form of a high ("H") level or a low ("L") level during the data transmission interval according to an input state from a switch, which corresponds to a predetermined channel when the data transmission/reception channel, specified sequentially by the negative-going pulse, indicates the predetermined channel.

On the other hand, one of the receive units detects the predetermined channel in the same way as the transmit unit described above. A voltage level on the communication line during the transmission interval is latched in response to a timing pulse. A relay connected to the receive unit is turned ON in response to the latched output so that the load is actuated. It is noted that after the end of the transmission interval, the synchronizer outputs the synchronization signal having an interval indicating "H" level.

In the system described above, when a plurality of communication channels are generated on the communication line at the same time, the data transmission from the transmit unit to the receive unit can be carried out on the same line.

However, in the conventional time-division multiplexing system, the output state of the synchronizer is a tri-state level. Therefore, logic circuitry for detecting the floating interval derived from the synchronizer becomes necessary for each transmit unit and receive unit. Consequently, the whole circuit construction of each transmit unit and receiver unit becomes complex. In addition, each synchronizer, transmit unit, and receive unit requires an expensive accurate clock generator. Therefore, the manufacturing cost of the whole multiplexing system becomes high.

Furthermore, the voltage level becomes unstable during the transmission interval if breakage of the communication line occurs in the vicinity of any one of the transmit units. Consequently, one of the transmit units will fail to read correct data.

On the other hand, since the output of the transmit units is a CMOS (complementary MOS) output, a single switch can only access the same transmission channel and data collision is not permitted since an intermediate level between the "H" and "L" levels may result, depending on the switched states of two or more switches. Hence, it is necessary to provide a wired-OR on a conventional wire harness in the vehicle. For example, in a case where two or more control switches for the same piece of equipment (radio and so on) are provided at two or more positions of the vehicle, double channels need to be prepared for transmitting the switch signals indicating the same meaning. The receive unit needs to receive the channels as wholly different double signals and therefore needs to provide a logical OR. Consequently, data transmission efficiency is hampered.

Furthermore, when the communication line is short-circuited (slight term short) in the "H" level output state such as occurs in the master synchronization interval, the short-circuited state is detected in the same way as the detection of a negative-going pulse used for the channel designation. Therefore, the channel counting in the transmit and receive units becomes erroneous. Consequently, a failure in transmission of data between the transmit and receive units may easily occur. In this way, reliability of data communication is reduced in the case when the above-described system is applied to the actual wire harness of the vehicle.

SUMMARY OF THE INVENTION

It is an object of the present invention to provide an improved system for transmitting and receiving data in the time-division multiplex mode.

It is an another object of the present invention to provide a system for transmitting and receiving data in the time-division multiplex mode which is simple in construction, inexpensive in manufacturing cost, and highly reliable in data transmission and reception without erroneous transmission of data.

The above-described objects can be achieved by providing a system for transmitting and receiving data in a time-division multiplexing mode, comprising:(a) a signal transmission line; (b) a power supply; (c) first means for cyclically generating and transmitting a pulse train signal to the signal transmission line, the pulse train signal having a master synchronization interval defined by disconnecting the power supply from the signal transmission line for a first predetermined time width and having a plurality of communication channel intervals, each channel interval defined by connecting the power supply to the signal transmission line for a second predetermined time width followed by disconnecting the power supply from the signal transmission line for a third predetermined time width; (d) second means for determining a specified channel interval from the plurality of channel intervals, detecting that the first means is connected to the signal transmission line via the power supply in the specified channel interval, and transmitting data represented by a pulse defined by connecting the power supply to the signal transmission line for a fourth predetermined time width, the fourth predetermined time width depending on an input state from an external apparatus of the second means; and (e) third means for determining the specified channel interval from the plurality of channel intervals, detecting that the first means is connected to the signal transmission line in the specified channel interval, and receiving the data from the signal transmission line and outputting a signal to a load of the third means according to the time width of the data during the specified channel interval.

The above-described objects can also be achieved by providing a system for transmitting and receiving data in a time-division multiplexing mode, comprising: (a) a signal transmission line; (b) a power supply; (c) first means for cyclically generating and transmitting a pulse train signal to the signal transmission line, the pulse train signal having a master synchronization interval defined by disconnecting the power supply from the signal transmission line for a first predetermined time width and having a plurality of communication channel intervals, each channel interval defined by connecting the power supply to the signal transmission line for a second predetermined time width followed by disconnecting the power supply from the signal transmission line for a third predetermined time width; (d) second means for determining a specified channel interval, allocated to each external apparatus connected to the second means, from the plurality of the communication channel intervals, detecting that the first means is connected to the signal transmission line via the power supply in each specified channel interval, and transmitting data represented by each pulse defined by connecting the power supply to the signal transmission line for each fourth predetermined time width, the fourth predetermined time width depending on each input state of the external apparatuses; and (e) third means for determining the specified channel interval allocated to each load corresponding to one of the external apparatuses from the plurality of communication channel intervals, detecting that the first means is connected to the signal transmission line via the power supply in each specified channel interval, and receiving the data from the signal transmission line and outputting each signal to each corresponding load according to the time width of the data during each specified channel interval.

The above-described objects can also be achieved by providing a system for transmitting and receiving data in a time-division multiplexing mode, comprising: (a) a signal transmission line; (b) a power supply; (c) first means for cyclically generating and transmitting a pulse train signal to the signal transmission line, the pulse train signal having a master channel interval defined by disconnecting the power supply from the signal transmission line for a first predetermined time width and having a plurality of communication channel intervals, each defined by connecting the power supply to the signal transmission line for a second predetermined time width followed by disconnecting the power supply from the signal transmission line for a third predetermined time width; (d) second means for determining a specified communication channel interval allocated to a plurality of external apparatuses connected to the second means from the plurality of communication channel intervals, detecting that the first means is connected to the signal transmission line via the power supply in the specified communication channel interval, and transmitting data represented by a pulse defined by connecting the power supply to the signal transmission line for a fourth predetermined time width the fourth predetermined time width depending on each input state of the external apparatuses; and (e) third means for determining the specified channel interval allocated to a load corresponding to an external apparatus from the plurality of the communication channel intervals, detecting that the first means is connected to the signal transmission line via the power supply in a specified communication channel interval, and receiving the data from the signal transmission line and outputting each signal to the corresponding load according to the time width of the data during the specified communication channel interval.

BRIEF DESCRIPTION OF THE DRAWINGS

FIGS. 5(A) to 5(F) are signal timing charts for explaining a whole operation of the data transmitting/receiving system shown in FIGS. 1 to 4.

DETAILED DESCRIPTION OF THE PREFERRED EMBODIMENT

Reference will hereinafter be made to the drawings in order to facilitate understanding the present invention.

FIGS. 1 to 5 (F) show a preferred embodiment according to the present invention.

Figure 1:
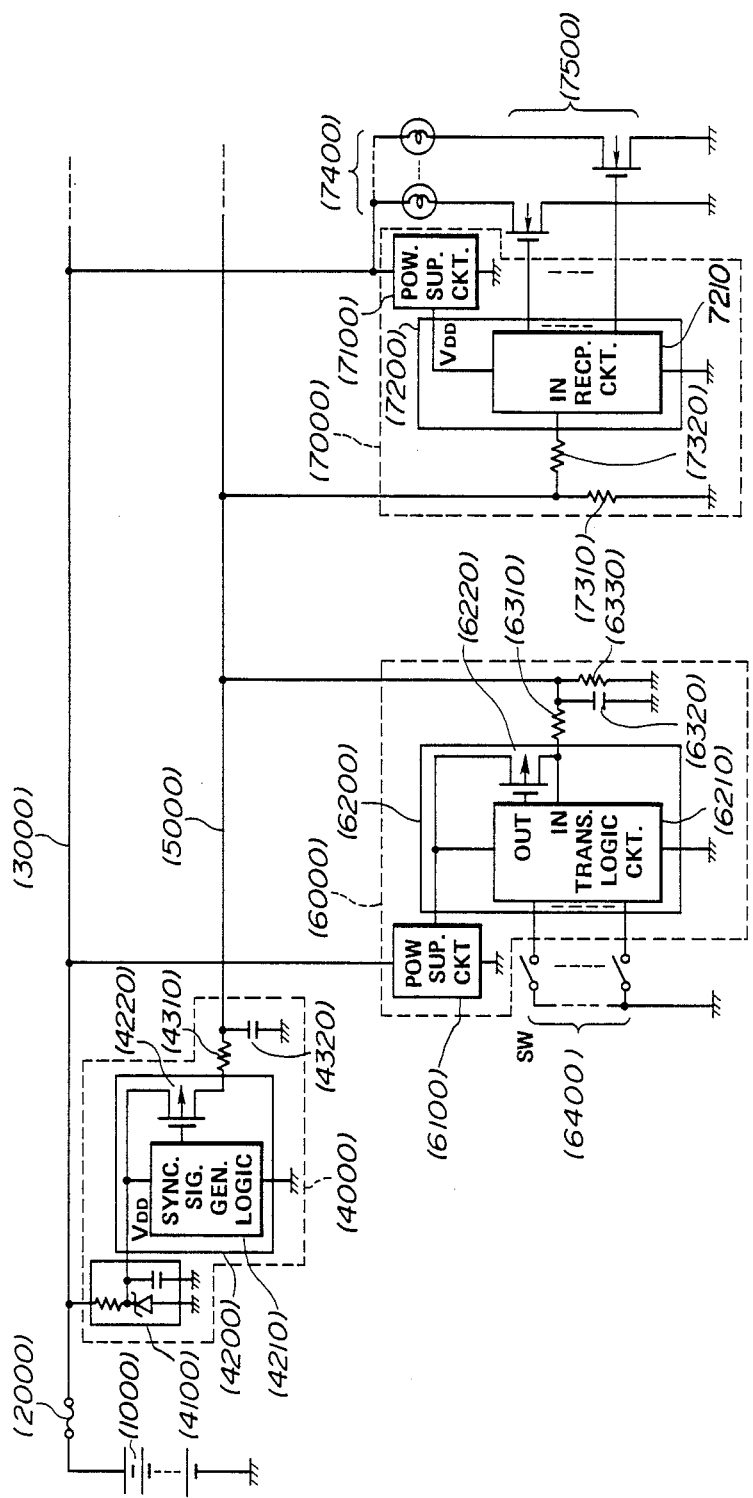
FIG. 1 is a simplified circuit wiring diagram of a system for transmitting and receiving data in a time-division multiplex mode in a preferred embodiment according to the present invention.

A time-division multiplex data transmitting/receiving system shown in FIG. 1 includes: (a) a DC power supply 1000 such as a vehicle battery; (b) a circuit breaker 2000; (c) a power supply line 3000 connected to the DC power supply 1000 via the circuit breaker 2000; (d) a communication line 5000; and (e) a multiplexing synchronizer 4000 to be described below.

The multiplexing synchronizer 4000 includes: (a) a power supply circuit 4100; (b) a synchronization signal generator 4200 having a logic circuitry 4210 to generate a synchronization signal and a P-channel MOS output driver 4220; and (c) output protective filters 4310, 4320.

The multiplex data transmitting/receiving system further includes one or more transmitters 6000, one of which is shown in FIG. 1. Each transmitter 6000 includes: (a) a power supply circuit 6100; (b) a transmission circuit 6200 having a transmission logic circuit 6210 and output driver 6220; (c) an output protective filter 6320; and (d) a pull-down resistor 6330. Each transmitter 6000 receives switch signals derived from one or a plurality of switches 6400.

On the other hand, the data transmitting/receiving system further includes one or more receivers 7000, one of which is also shown in FIG. 1.

Each receiver 7000 includes a power supply circuit 7100, a reception circuit 7200, an input pull-down resistor 7310, and an input protective circuit 7320. Each transistor 7500 connected to the receiver 7000 is controlled according to an output state of the receiver 7000 so that each or any of a plurality of loads 7400, each connected to the corresponding transistor 7500, are actuated.

Figure 2:
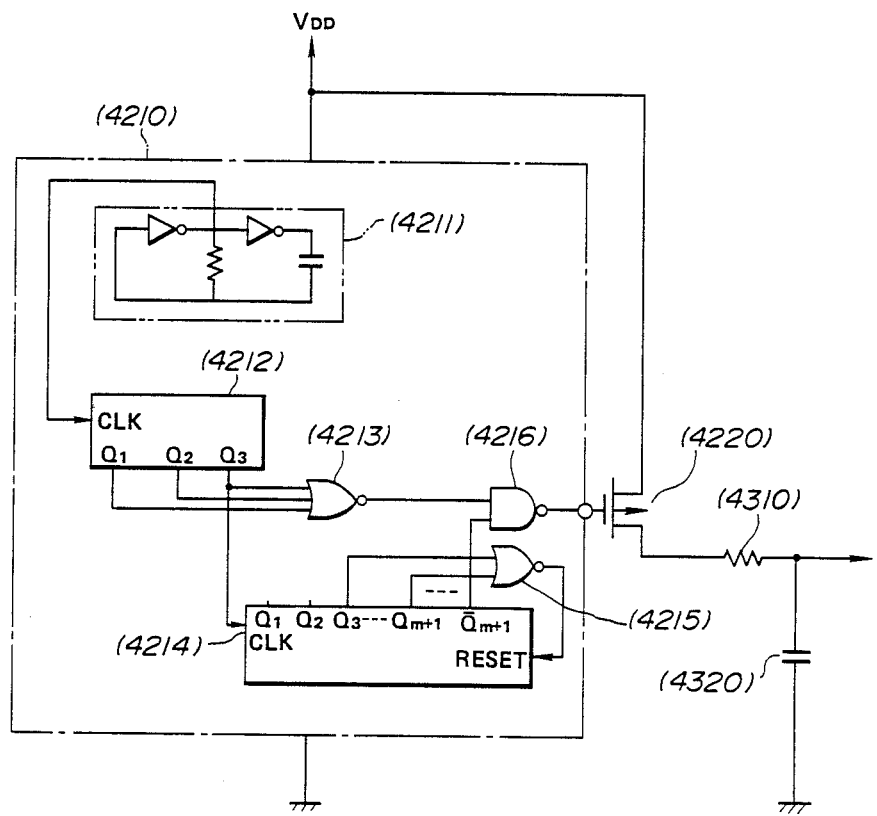
FIG. 2 is a simplified circuit wiring diagram of a multiplexing synchronizer shown in FIG. 1.

The synchronization signal generation logic circuitry 4210 of the multiplexing synchronizer 4000 will be described in detail with reference to FIG. 2.

The synchronization signal generation logic circuitry 4210 includes an oscillator 4211, an 8-divided counter 4212, a tri-input NOR gate circuit 4213, a $2^{m+1}$ divided counter 4214, a two-input NOR gate circuit 4215, and a NAND gate circuit 4216.

The oscillator 4211 generates clock pulses having a frequency of 10 kHz and supplies the pulses to a clock input terminal CLK of the 8-divided counter 4212. Each output signal of two-divided portion $Q_1$, four-divided portion $Q_2$, and eight-divided portion $O_3$ of the eight-frequency-divided counter 4212 is supplied to the tri-input NOR gate circuit 4213. Consequently, a continuous pulse waveform, in which a positive-going pulse having a width of 100 microseconds appears for each 800 microseconds (refer to the solid line in the interval denoted by 1008 in FIG. 5(A)). The eight-divided output $Q_3$ of the eight-divided counter 9212 is supplied to the $2^{m+1}$-divided counter 4214 as clock pulses having a frequency of 1.25 kHz (10 kHz/8). The $2^{m+1}$-frequency-divided counter 4214 supplies the outputs of eight-divided portion $Q_3$ and $2^{m+1}$ divided portion $Q_{m+1}$ to the two-input NOR gate circuit 4215. The $2^{m+1}$-divided counter 4214 receives the output signal of the NOR gate circuit 4215 as a reset signal. In addition, the NAND gate circuit 4216 receives the output signal of the tri-input NOR gate circuit 4213 and the reversed output $(\overline{Q}_{m+1})$ signal of the $2^{m+1}$-divided portion $(Q_{m+1})$ of the $2^{m+1}$-divided counter 4214. A P-channel MOS-FET (Metal Oxide Semiconductor—Field Effect Transistor) 4220 is driven in response to the output level signal of the NAND gate circuit 4216. Thus, after pulse signals 1001, as denoted by a solid line in FIG. 5(A), are generated by $2^m$ (800 $\mu$sec. x $2^m$), a continuously repeating signal having a pause interval of 3200 microseconds is outputted onto the communication line 5000.

It is noted that the "H" level of the continuously repeating signal (in FIG. 5(A), 1001) is supplied to the line 5000 (including pull-down resistors 6330, 7310) on the basis of the voltage level of a power supply ($V_{DD}$) of the synchronizer 4210 via the on (conducted) state of the P-channel MOS-FET 4220.

It is also noted that the "L" level is defined and ensured by means of the pull down-resistors 6330, 7310 of the transmitter 6000 and the receiver 7000 shown in FIG. 1, when the P-channel MOS-FET 4220 becomes non-conductive (OFF).

It is furthermore noted that symbol m denotes an integer and m is given as $m = \log_2 N$ on the basis of the required number of communication channels N ($= 2^m$).

Next, the transmission logic circuitry 6210 of the transmitter 6000 will be described in detail with reference to FIG. 3.

Figure 3:
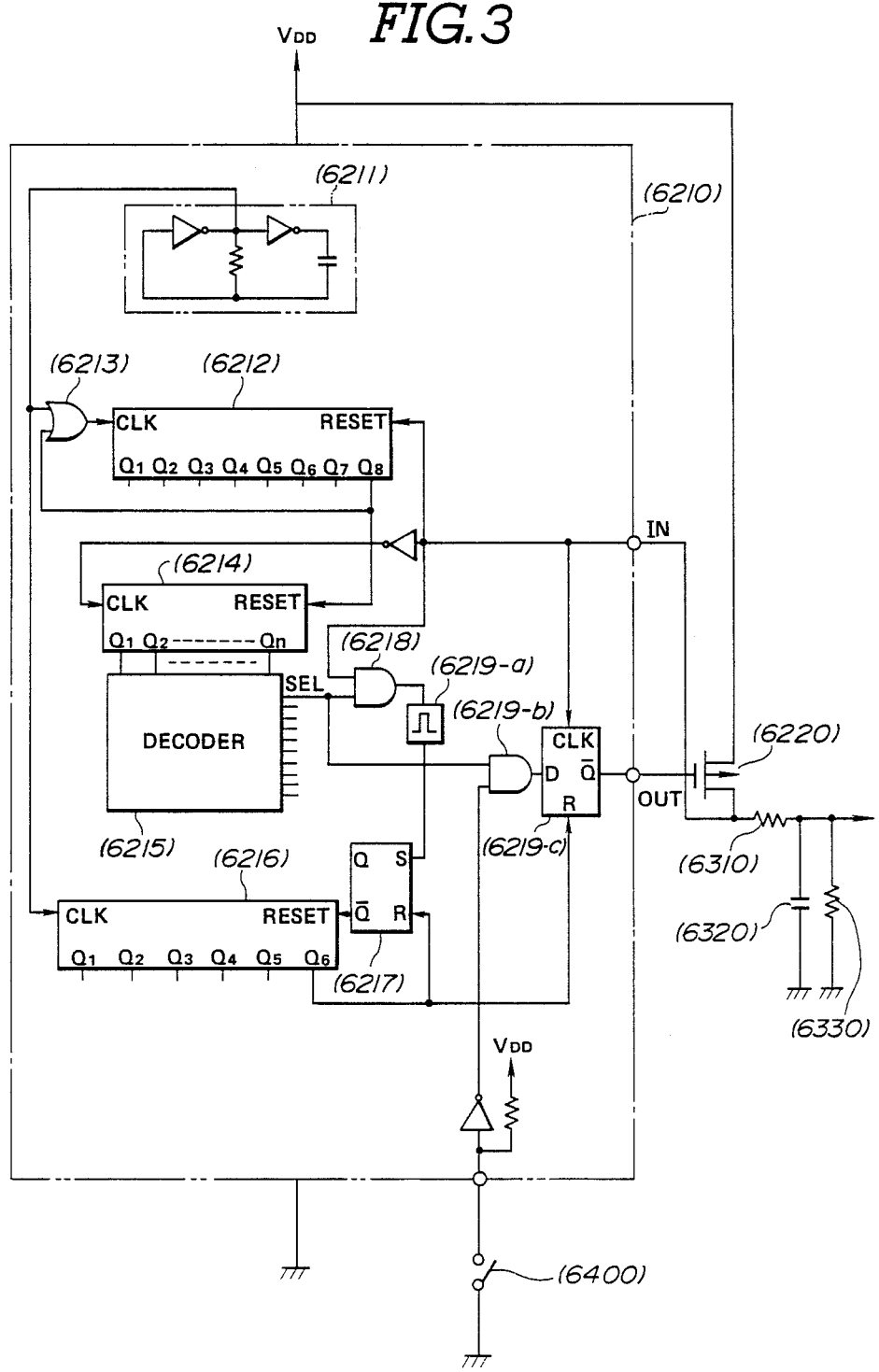
FIG. 3 is a simplified circuit block diagram of a logic circuitry in a transmitter shown in FIG. 1.

In FIG. 3, the transmission logic circuitry 6210 includes an oscillator 6211, an $2^8$-frequency-divided counter 6212, an OR gate circuit 6213, a channel counter 6214, a decoder 6215, a $2^6$-frequency-divided counter 6216, a flip-flop circuit 6217, an AND gate circuit 6218, an edge trigger circuit 6219-a, an AND gate circuit 6219-b, and a flip-flop circuit 6219-c.

The oscillator 6211 generates clock pulses having a frequency of 80 kHz. The output signal of the oscillator 6211 is supplied to the $2^8$-divided counter 6212 via the OR gate circuit 6213 to detect the "L" level interval, i.e., a master synchronization interval of 3200 microseconds which appears on the above-described communication line 5000.

The $2^8$-divided counter 6212 receives the voltage level of the communication line 5000 at its reset terminal. The $2^8$-divided counter 6212 starts to count only when the voltage level of the communication line 5000 is "L". In addition, the $2^8$-divided counter 6212 does not accept any clock pulse after the division of $2^8$ because the $2^8$ divided output ($Q_8$) is inputted to the OR gate circuit 6213. A count overflow is, at this time, inhibited. The $2^8$-divided output ($Q_8$) is outputted as an "H" level output signal (1/80 kHz×$2^7$ =) 1600 microseconds after the counting of the clock pulses is started. That is to say, during an interval in which the synchronization clock pulse 1001 is generated by $2^m$ for each 800 microseconds, the counter 6212 is reset every 800 microseconds. Thus, no $2^8$-divided pulse ($Q_8$) is outputted from the $Q_8$ output portion.

On the other hand, since the "L" level state is continued for 3200 microseconds when the synchronization signal on the line 5000 indicates the master synchronization interval 1007, the $Q_8$ output ("H" level) appears as a detection signal to detect the master synchronization interval 1600 microseconds after the "H" level pulse of the $2^m$ order is generated. As shown in FIG. 5(B), the $Q_8$ output is held during the interval 1003 (= 1600 microseconds) until the next positive-going pulse is generated as shown in FIG. 5(B).

The channel counter 6214 is reset by means of an output of the detection signal ($Q_8$) indicative of detection of the master synchronization interval. Thereafter, the number of positive-going pulses 1001 appearing on the communication line 5000 are sequentially counted on the basis of the falling edges of the pulses 1001 until $2^m$ is reached. The channel decoder 6215 extracts only preselected channel intervals (SEL) on the basis of the output of the counter 6214. The channel decoder 6215 outputs an "H" level signal during the preselected channel interval an "L" level signal otherwise.

The channel interval is defined by an interval from the falling edge of the positive-going pulse on the communication line 5000 to the next falling edge thereof. As shown in FIG. 5(F), a second channel (CH) starts at the falling edge of the first positive-going pulse after the master synchronization interval and ends at the falling edge of the second positive-going pulse. Thereafter, other channels (3CH), ... N (= $2^m$) are defined. A first channel (1CH) is defined by an interval starting at the falling edge of the positive-going pulse of N (= $2^m$) order and ending at the falling edge of the first positive-going pulse of the next cycle.

When the positive-going pulse 1001 generated by the synchronizer 4200 appears on the communication line 5000 and the selected channel (SEL) indicates the "H" level, the rising edge of the positive-going pulse 1001 appears via the AND gate circuit 6218. The positive-going pulse is inputted to the edge trigger circuit 6219-a to set the R-S flip-flop circuit 6217.

On the other hand, the $2^6$-divided counter 6216 receives the $\overline{Q}$ output signal of the flip-flop circuit 6217 as a reset signal. As described above, when the flip-flop circuit 6217 is set, its $\overline{Q}$ output turns to and holds the "L" level. During the "L" level of the $\overline{Q}$ output of the flip-flop circuit 6217, the $2^6$-divided counter 6216 continues to count the clock pulses having a frequency of 80 kHz derived from the oscillator 6211. Then, after the count operation thereof is started, the $Q_6$ active output of the $2^6$-divided counter 6216 is supplied to a reset terminal R of the R-S flip-flop circuit 6217. Thus, the flip-flop circuit 6217 is reset in response to the $Q_6$ output active signal. Hence, the $\overline{Q}$ output level of the flip-flop circuit 6217 turns to the "H" level. At this time, the counter 6216 is also immediately reset in response to the $\overline{Q}$ output active signal of the flip-flop circuit 6217. It is noted that the flip-flop circuit 6217 is a reset priority type.

In this way, one positive-going pulse 1004 having an extremely narrow pulsewidth is outputted from a terminal $Q_6$ of the $2^6$ divided counter 6216. It is noted that this pulse 1004 has a width sufficient to reset the flip-flop circuit 6217 and appears 400 microseconds after the positive-going pulse 1001 appears on the communication line 5000. (Refer to FIG. 5(C).)

Next, the reception circuit 7210 of the receiver 7000 will be described in detail with reference to FIG. 4.

Figure 4:
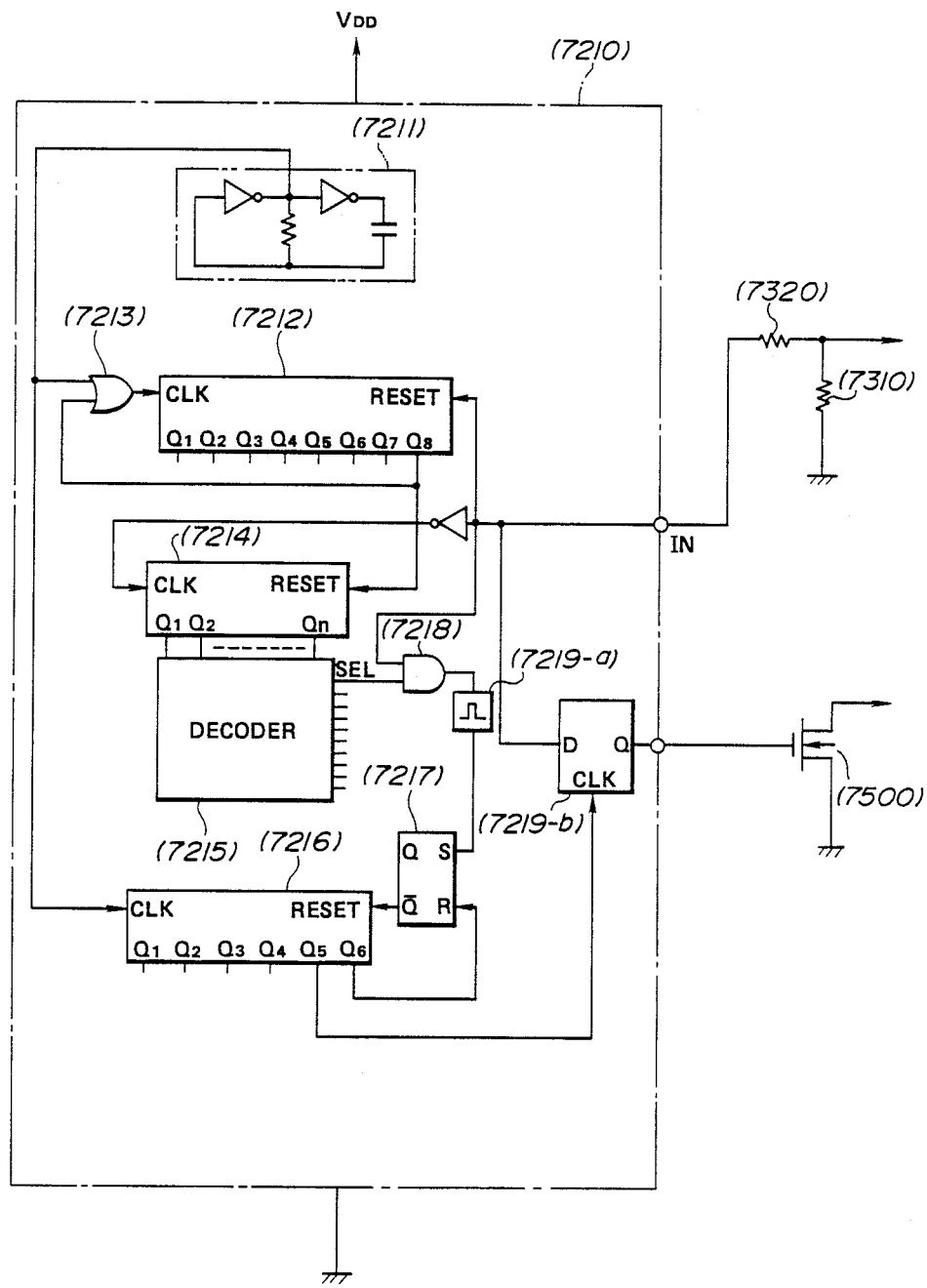
FIG. 4 is a simplified circuit block diagram of a receiver shown in FIG. 1

In FIG. 4, the reception circuit 7210 includes an oscillator 7211, $2^8$-frequency-divided counter 7212, OR gate circuit 7213, a channel counter 7214, a decoder 7215, $2^6$-frequency-divided counter 7216, a flip-flop circuit 7217, an AND gate circuit 7218, an edge trigger circuit 7219-a, and a D type flip-flop circuit 7219-b. Since the construction of the reception circuit 7210 is the same as that of the transmission logic circuitry 6210, the detailed description of the construction of the reception circuit 7210 is omitted here.

Next, operation of the data transmitting/receiving system in the preferred embodiment will be described.

In FIG. 3, any one of the channels is allocated to an external switch 6400. Suppose that a single switch 6400 is connected to the transmitter 6000 as shown in in FIG. 3. When the switch 6400 is turned on, the switch on signal is inverted to the "H" level and is supplied to the AND gate circuit 6219-b together with a channel output (SEL) corresponding to the switch 6400. An output signal of the AND gate circuit 6219-b, thus, indicates the "H" level only during the channel interval, i.e., only when the selected channel output (SEL) is at the "H" level and the switch 6400 is turned to ON. The output signal of the AND gate circuit 6219-b indicates the "L" level otherwise.

If the selected channel (SEL) is, for example, the first channel (1CH), the AND gate circuit 6219-b outputs the "H" level signal when the switch 6400 is turned to ON. On the other hand, if the switch 6400 is turned to OFF, the AND gate circuit 6219-b outputs the "L" level signal.

The D type flip-flop circuit 6219-c has a clock input terminal to which each rising edge of the positive-going pulses appearing on the communication line 5000 is supplied, has a data input terminal to which the output signal of the AND gate circuit 6219-b is supplied, and has a reset terminal to which the output $Q_6$ of the $2^6$ divided counter 6216 is supplied. Hence, when the switch 6400 is turned to ON, the D-type flip-flop circuit 6219-c is set on the rising edge of the first positive-going pulse which is generated after the first channel (1CH) interval ($\overline{Q}$ output indicates the "L" level). After the time lapse of 400 microseconds, the $Q_6$ output of the $2^6$-counter 6216 is outputted (refer to FIG. 5(C)) and the D-type flip-flop circuit 6219-c is reset (Q output indicates the "H" level).

Since the $\overline{Q}$ output of the flip-flop circuit 6219-c is transmitted to the P-channel MOS-FET 6220, the P-channel MOS-FET 6220 generates the positive-going pulse 1005 on the communication line 5000 using the voltage of the power supply circuit 6100 of the transmitter 6000 for the interval of 400 microseconds. (Refer to FIG. 5(D).)

In this case, the positive-going pulse 1001 derived from the synchronizer 4000 and the 1005 pulse derived from the transmitter 6000 are superposed on the communication line 5000. When the data indicates "0" (that is switch 6400 is turned to OFF), the positive-going pulse 1001 having a width of only 100 microseconds appears on the line 5000. When the data indicates "1" (=switch 6400 is turned to ON), the positive-going pulse 1005 having a greater width of 400 microseconds appears on the line 5000.

In FIG. 4, the voltage level on the communication line 5000 is supplied to the data input terminal of the D type flip-flop circuit 7219-b. The $2^5$-divided output ($Q_5$) (it becomes "H" level 200 microseconds after the start of counting) of the $2^6$-divided counter 7216 is supplied to the clock input terminal of the D type flip-flop circuit 7219-b.

Hence, if the selected channel (SEL) is, for example, the first channel (1CH), the $Q_5$ output rises to the "H" level 200 microseconds after the first positive-going pulse generated during the first channel interval (Refer to numeral 1006 of FIG. 5 (E)).

When the transmission data of the first channel (1CH) indicates "1" (the width of the positive-going pulse =400 microseconds), the Q output of the D type flip-flop circuit 7219-b indicates and holds the "H" level. When the transmission data indicates "0" (a width of the positive-going pulse =100 microseconds), the Q output indicates and holds the "L" level. Then, the value of Q is held until the next (one cycle after) positive-going pulse 1006 is generated. In this way, when Q ="H" level, i.e., the switch 6400 is turned to ON, the transistor 7500 is conducted (ON) and the corresponding load 7400 is actuated.

In this way, since in the preferred embodiment the signal synchronization of each signal transmission and reception is taken on the falling and rising edges of the positive-going pulses on the communication line 5000, the circuit construction becomes simple. Even if the accuracy of the oscillator in each circuit of the system deviates by ±30%, no erroneous operation will occur and thus inexpensive multiplexing of data transmission and reception may be achieved.

Even when the communication line 5000 is instantaneously broken due to failure in connectors for the respective units, the voltage level on the communication line 5000 is fixed to the "L" level. Therefore, for example, although the data represented by "1" (400 microseconds) may often be changed to the data represented by "0" (below 20 microseconds), the data "0" can not be changed to the data "1". Consequently, the whole system is provides a fail safe structure. In addition, if the communication line 5000 is short-circuited, the communication line 5000 is almost grounded (to the "L" level). Therefore, in the same way as the instantaneous breakage of the line, the whole system is a fail safe structure.

That is to say, if breakage and short-circuiting occur on the communication line 5000, the whole system provides the fail safe structure, thus ensuring safety.

Similarly, since the master synchronization interval is indicated only by the "L" level, the instantaneous breakage of short-circuiting of the communication line 5000 can be accurately detected. Hence, since the updating of the data contents for each cycle can be accurately carried out, the reliability of data transmission and reception is enhanced.

Furthermore, since switches which can be accessed onto the same channel may be plural due to open drain type outputs, data collisions are permitted. Due to the wired-OR structure on the communication line 5000, two switches, remote from each other, can easily control the same piece of equipment. Consequently, data transmission efficiency is increased.

As described hereinabove, since according to the present invention the output modes of the synchronizer and transmitters are open-drain types, the data active logic system is the positive logic system, and the master synchronization interval is indicated only by the "L" level, the whole circuit construction becomes extremely simple. The cost of the whole system is remarkably reduced. Since instantaneous breakage and short-circuiting occur on the communication line, the system provides the fail safe structure therein. Consequently, the safe operation of data transmission and reception in the whole system can be assured. In addition, since the master synchronization interval can be accurately detected, the reliability of data transmission is improved. Furthermore, since the outputs of the synchronizer and transmitters are open drain output types, a plural number of switches which can be accessed onto the same channel may be achieved. Consequently, the data transmission and reception efficiency is enhanced.

In the way described above, the multiplexing system according to the present invention has numerous advantages.

It will be clearly understood by those skilled in the art that the foregoing description may be made in terms of the preferred embodiment and that various changes and modifications may be made without departing from the scope of the present invention which is to be defined by the appended claims.

What is claimed is:

1. A system for transmitting and receiving data in a time-division multiplexing mode, comprising:
    (a) a signal transmission line;
    (b) a power supply;
    (c) first means for cyclically generating and transmitting a pulse train signal to the signal transmission line, the pulse train signal having a master synchronization interval defined by disconnecting the power supply from the signal transmission line for a first predetermined time width and having a plurality of communication channel intervals, each channel interval defined by connecting the power supply to the signal transmission line for a second predetermined time width followed by disconnecting the power supply from the signal transmission line for a third predetermined time width;
    (d) second means for determining a specified channel interval from the plurality of channel intervals, detecting that the power supply is connected to the signal transmission line via the first means in the specified channel interval, and transmitting data represented by a pulse defined by connecting the power supply to the signal transmission line for a fourth predetermined time width, the fourth predetermined time width depending on an input state from an external apparatus of the second means; and
    (e) third means for determining the specified channel interval from the plurality of channel intervals, detecting that the first means is connected to the signal transmission line in the specified channel interval, and receiving the data from the signal transmission line and outputting a signal to a load of the third means according to the time width of the data during the specified channel interval.

2. The system as recited in claim 1, wherein at least one of the second or third means includes a pull down resistor between the signal transmission line and ground.

3. The system as recited in claim 2, wherein the master synchronization interval is at a logic "L" level substantially equal to the ground level.

4. The system as recited in claim 1, wherein the first means comprises:
    (a) an oscillator which generates clock pulses having a predetermined frequency;
    (b) first counting means for counting the number of clock pulses from the oscillator and outputting frequency divided clock pulses, each pulse having the second predetermined time width for each third predetermined time width;
    (c) second counting means for counting the number of the frequency divided clock pulses from the first counting means and outputting a clock pulse having an interval equal to the master synchronization interval; and
    (d) a first switching element for connecting the power supply to the signal transmission line when receiving the frequency divided clock pulses, each pulse having the second predetermined time width for each third predetermined time width from the first counting means and for disconnecting the power supply from the signal transmission line when receiving the clock pulse having the interval equal to the master synchronization interval from the second counting means.

5. The system as recited in claim 4, wherein the second means comprises:
    (a) an oscillator which generates clock pulses having another predetermined frequency;
    (b) third counting means for counting the number of clock pulses from the oscillator of the second means and outputting a signal indicative of a predetermined number of clock pulses, the signal being outputted only during the master synchronization interval so that the master synchronization interval is detected;
    (c) fourth counting means for counting the number of pulses appearing on the signal transmission line and outputting a signal indicative of the counted number, the fourth counting means being reset in response to the output signal of the third counting means;
    (d) first decoding means for decoding the output signal of the fourth counting means and outputting a signal indicative of the selection of the specified channel interval;
    (e) fifth counting means for counting the number of clock pulses derived from the oscillator of the second means and outputting a signal indicative of the fourth predetermined time width when the number of clock pulses reaches a predetermined number;
    (f) a first flip-flop circuit means for receiving the signal indicative of the selection of the specified channel interval of the first decoding means and a signal indicative of the on or off state of the external apparatus, in response to the pulse signal having the second predetermined time width from the signal transmission line and for outputting a signal having a pulsewidth equal to the fourth predetermined time width when the external apparatus is in the on state and outputting no signal when the external apparatus is in the off state; and
    (g) a second switching element for connecting the power supply to the signal transmission line when receiving the signal from the flip-flop circuit means for the fourth predetermined time width and for disconnecting the power supply from the signal transmission line when receiving no signal from the flip-flop circuit means.

6. The system as recited in claim 5, wherein the third means comprises:
   (a) an oscillator which generates clock pulses having a predetermined frequency;
   (b) sixth counting means for counting the number of clock pulses from the oscillator of the third means and outputting a signal indicative of a predetermined number of the clock pulses, the signal being outputted only during the master synchronization interval so that the master synchronization interval is detected;
   (c) seventh counting means for counting the number pulses appearing on the signal transmission line and outputting a signal indicative of the counter number, the seventh counting means being reset in response to the output signal of the sixth counting means;
   (d) second decoding means for decoding the output signal indicative of the selection of the specified channel interval;
   (e) eighth counting means for counting the number of clock pulses derived from the oscillator of the third means and outputting a signal indicative of a fifth predetermined time width when the counted clock pulse number reaches a predetermined number, the signal being outputted a sixth predetermined time width after the pulse of the pulse train signal, indicative of the start of the specified channel interval, is received from the signal transmission line; and
   (f) a second flip-flop circuit means for receiving the pulse signal from the second switching element of the second means via the signal transmission line in response to the output signal of the eighth counting means and outputting a signal to a driving element so as to actuate the load when receiving the pulse signal having the fourth predetermined time width, and outputting no signal to the driving element so as to deactuate the load when receiving a pulse signal having no fourth predetermined time width.

7. The system as recited in claim 4, wherein the number of the frequency divided clock pulses from the first counting means to be counted by the second counting means depends on the number of communication channels.

8. The system as recited in claim 5, wherein the first and second switching elements comprise P-channel MOS Field Effect transistors, drains thereof being connected to the power supply and source thereof being connected to the signal transmission line via a resistor.

9. The system as recited in claim 6, wherein the external apparatus comprises a switch and the load comprises a light.

10. The system as recited in claim 6, wherein the second flip-flop circuit means holds the output signal to the driving element until the next different pulse signal is received.

11. A system for transmitting and receiving data in a time-division multiplexing mode, comprising:
   (a) a signal transmission line;
   (b) a power supply;
   (c) first means for cyclically generating and transmitting a pulse train signal to the signal transmission line, the pulse train signal having a master synchronization interval defined by disconnecting the power supply from the signal transmission line for a first predetermined time width and having a plurality of communication channel intervals, each channel interval defined by connecting the power supply to the signal transmission line for a second predetermined time width followed by disconnecting the power supply from the signal transmission line for a third predetermined time width;
   (d) second means for determining a specified channel interval allocated to each external apparatus connected to the second means from the plurality of the communication channel intervals, detecting that the power supply is connected to the signal transmission line via the first means in each specified channel interval, and transmitting data represented by each pulse defined by connecting the power supply to the signal transmission line for a fourth predetermined time width the fourth predetermined time width depending on each input state of the external apparatuses; and
   (e) third means for determining the specified channel interval allocated to each load corresponding to one of the external apparatuses from the plurality of the communication channel intervals, detecting that the power supply is connected to the signal transmission line via the first means in each specified channel interval, and receiving the data from the signal transmission line and outputting each signal to each corresponding load according to the time width of the data during each specified channel interval.

12. A system for transmitting and receiving data in a time-division multiplexing mode, comprising:
   (a) a signal transmission line;
   (b) a power supply;
   (c) first means for cyclically generating and transmitting a pulse train signal to the signal transmission line, the pulse train signal having a master synchronization interval defined by disconnecting the power supply from the signal transmission line for a first predetermined time width and having a plurality of communication channel intervals, each channel interval defined by connecting the power supply to the signal transmission line for a second predetermined time width followed by disconnecting the power supply from the signal transmission line for a third predetermined time width;
   (d) second means for determining a specified communication channel interval allocated to a plurality of external apparatuses connected to the second means from the plurality of the communication channel intervals, detecting that the power supply is connected to the signal transmission line via the first means in the specified communication channel interval, and transmitting data represented by a pulse defined by connecting the power supply to the signal transmission line for a fourth predetermined time width the fourth predetermined time width depending on each input state of the external apparatuses; and
   (e) third means for determining the specified channel interval allocated to a load corresponding to the external apparatuses from the plurality of the communication channel intervals, detecting that the power supply is connected to the signal transmission line via the first means in a specified communication channel interval, and receiving the data from the signal transmission line and outputting each signal to the corresponding load according to the time width of the data during the specified communication channel interval.

* * * * *